United States Patent [19]

Ramos

[11] Patent Number: 4,709,315

[45] Date of Patent: Nov. 24, 1987

[54] ISOLATED CONTROLLER CIRCUIT

[75] Inventor: Richard Ramos, Placentia, Calif.

[73] Assignee: Rockwell International Corporation, El Segundo, Calif.

[21] Appl. No.: 934,516

[22] Filed: Nov. 24, 1986

[51] Int. Cl.⁴ .......................................... H02M 3/335
[52] U.S. Cl. .......................................... 363/21; 363/97
[58] Field of Search .................................. 363/20-21, 363/41, 97

[56] References Cited

U.S. PATENT DOCUMENTS

| | | | |
|---|---|---|---|
| 4,063,307 | 12/1977 | Stephens | 363/21 |
| 4,195,333 | 3/1980 | Hedel | 363/21 |
| 4,466,051 | 8/1984 | Fitzgerald | 363/21 |

Primary Examiner—Peter S. Wong
Attorney, Agent, or Firm—H. Fredrick Hamann; George A. Montanye; James F. Kirk

[57] ABSTRACT

An isolated controller circuit responsive to an input signal voltage from the output of a low-pass filter referenced to an isolated reference potential; the controller circuit being characterized to provide a control signal at a signal output terminal referenced to a non-isolated reference potential. The isolated controller circuit comprises: a reference signal source referenced to the isolated reference potential for providing a reference signal and an amplifier and compensation means for amplifying and compensating the signal difference between the input signal and the reference signal to provide a compensated control signal referenced to the isolated reference potential. The controller circuit also has an oscillator and coupling means for coupling and scaling the compensated control signal referenced to the isolated reference potential and it provides the control signal at the signal output terminal referened to the non-isolated reference potential.

11 Claims, 1 Drawing Figure

4,709,315

ISOLATED CONTROLLER CIRCUIT

This invention was made with Government support under Contract No. F04704-84-C-0061 awarded by the Department of the Air force. The Government has certain rights in this invention.

BACKGROUND OF THE INVENTION

1. Field of the Invention

This invention relates to the field of solid state power conversion and more paraticularly to the field of circuits designed for use within switch mode power converters having output voltage levels that are electrically isolated from the input main power bus.

The invention isolated controller circuit is useful for sensing an output voltage level from a power supply measured with respect to an isolated voltage reference such as an isolated ground, comparing the output voltage signal with a precision reference, compensating the output signal with a compensation network selected to enhance the stability of the power converter, and coupling the control signal to an output terminal referenced to a non-isolated voltage reference such as the power return for the input power main. The output control signal referenced to the non-isolated voltage reference system is used to control the duty cycle ratio of the duty cycle converter or pulse width modulated converter.

2. Description of the Prior Art

Presently known isolated controller circuits use opto-electronic coupling for coupling a control signal from a source referenced to an isolated voltage reference to an output terminal referenced to a non-isolated voltage reference. Opto-electronic couplers have undesirable aging properties, are temperature sensitive and are sensitive to radiation effects, such as gamma ray radiation.

SUMMARY OF THE INVENTION

It is a major objective of this invention to provide an efficient, compact, reliable, solid state isolated controller circuit that uses relatively few and relatively inexpensive parts. It is another objective of this invention to reduce the printed circuit board space required to fabricate the circuit by reducing the number of components required.

It is a more particular objective of this invention to provide an isolated controller circuit that is relatively insensitive to radiation effects, such as prompt gamma radiation effects.

It is another objective of the invention isolated controller circuit to be relatively insensitive to component characteristic variations induced by temperature change, such as diode forward voltage drops. The invention circuit is designed to be free of any requirement for matched components, such as diodes and transistors or field effect transistors. The invention isolated controller circuit has a reference signal source referenced to the isolated reference potential for providing a reference signal. An amplifier and compensation means is used for amplifying and compensating the signal difference between the input signal and the reference signal to provide a control signal referenced to the isolated reference potential, such as an isolated output ground. An oscillator and coupling means is used for coupling and scaling the control signal referenced to the isolated reference potential to a signal output terminal referenced to a non-isolated reference potential. The oscillator and coupling means contains a rectifier filter means for rectifying and filtering the switched control voltage from the secondary of a transformer. The center tap of the primary of the transformer is driven by the compensated control signal. Opposing end terminals of the primary of the transformer are switched alternately to the isolated reference pootential by an oscillator switching means.

DESCRIPTION OF THE PREFERRED EMBODIMENT

Figure 1:
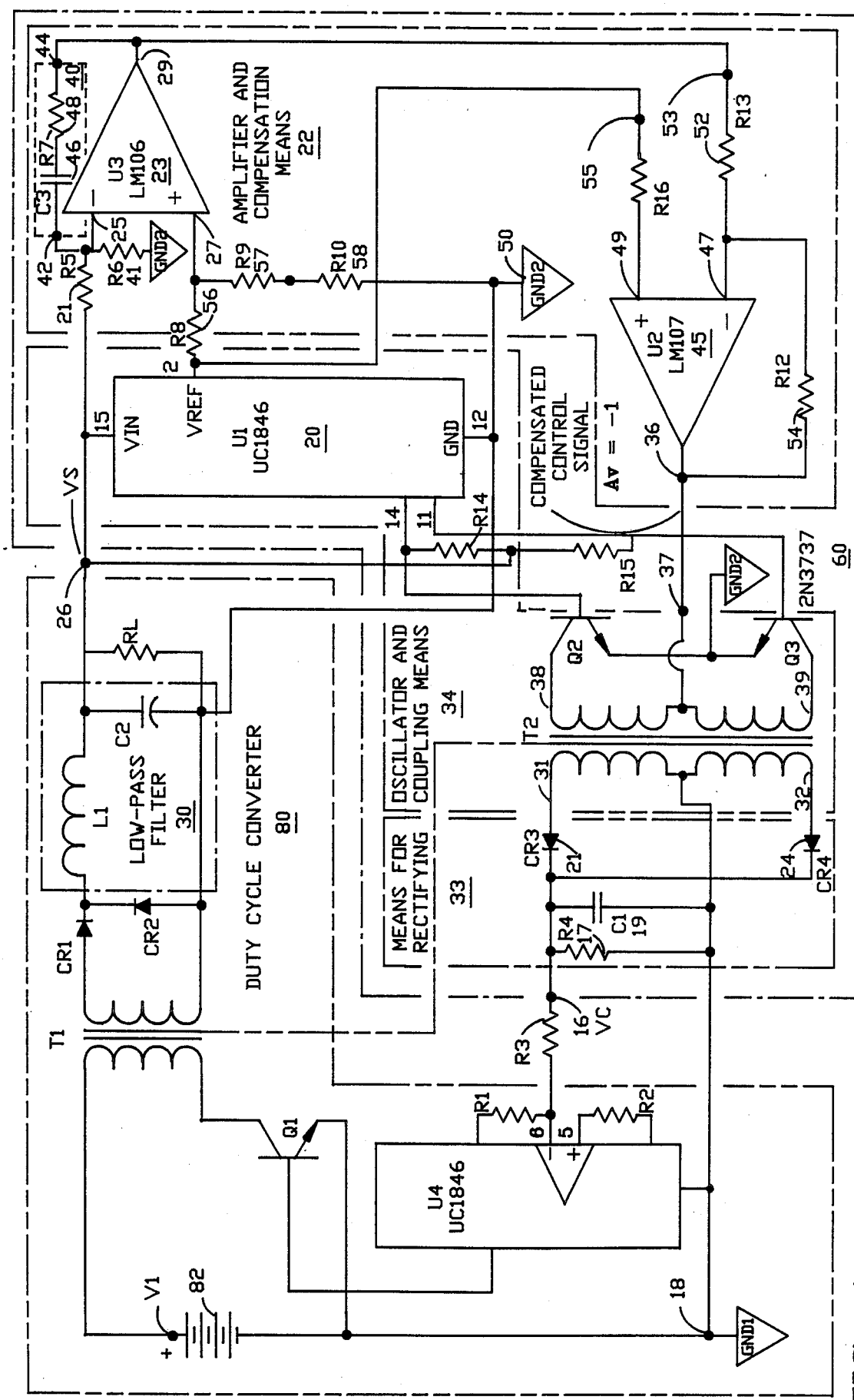
FIG. 1 is a schematic of the invention isolated controller circuit coupled for use with a duty cycle converter.

FIG. 1 shows the invention isolated controller circuit within phantom block 60. The controller circuit is responsive to an input signal VS applied to controller circuit input terminal 26 from the output of a low-pass filter, such as the low-pass filter within phantom block 30. The input signal is referenced to an isolated reference potential, such as GND2 50 for providing a control signal VC at controller circuit signal output terminal 16 referenced to a non-isolated reference porential such as GND1, 18.

The invention isolated controller circuit within phantom block 60 comprises a reference signal source for providing a reference signal such as VREF, the 5.0 Vdc reference voltage at pin 2 of the U1 integrated circuit. This reference voltage is referenced to the isolated reference potential GND2, 50.

Phantom block 22 contains an amplifier and compensation means for amplifying and compensating the signal difference between the input signal VC at controller circuit input terminal 26 and the reference signal VREF from the reference signal source at U1-2 to provide a compensated control signal at amplifier and compensation means output terminal 36 referenced to the isolated reference potential 50.

Phantom block 34 contains an oscillator and coupling means for coupling and scaling the compensated control signal at coupling means input terminal 37 referenced to the isolated reference potential 50 to the controller circuit signal output terminal 16 referenced to the non-isolated reference potential, such as GND1, 18.

The amplifier and compensation means 22 has a first differential amplifier, such as U3, 23 having an inverting input 25, a non-inverting input 27 and an output terminal 29. The amplifier and compensation means also has a compensation circuit, such as the circuit shown within phantom block 40. The conpensation network has a first and second terminal 42, 44 and circuit elements selected to provide a predetermined impedance characteristic between the first and second terminal. The amplifier and compensation means also has a buffer amplifier, such as U2, 45. The buffer amplifier 45 has an inverting and a non-inverting input terminal 47, 49 respectively and an output terminal, also coupled to terminal 36.

The first differential amplifier inverting input 25 is coupled to the input signal at terminal 26 via input resistor R5, 21. The amplifier non-inverting input 27 is coupled to receive the reference signal VREF from the +5 Vdc reference signal source at U1-2. The compensation circuit 40 is coupled between the first differential amplifier inverting input 25 and output terminal 29.

The buffer amplifier inverting input 47 is coupled to the first differntial amplifier output terminal 29 via resistor R13, 52. The buffer amplifier non-inverting input 49 is coupled to the voltage reference, such as VREF, the +5 Vdc reference signal source at U1-2. The buffer amplifier has a feedback resistor R12, 54 that is selected along with R13, 52 to provide a predetermined voltage gain for the signal between the first differential amplifier output terminal 29 and the buffer amplifier output terminal 36.

In the preferred embodiment of FIG. 1, the compensation means compensation circuit 40 has a resistor R7, 48 is series with a capacitor C3, 46. In a first alternative embodiment, the resistance and capacitance of the resistor and capacitor is selected to establish the break frequency of the compensation circuit to be within a frequency range of plus or minus one-half octave of a design frequency centered at the break frequency of the low-pass filter. For example, if the break frequency of the low-pass filter 30 was set at 1.0 KHz, the break frequency of the compensation network would be designed to be centered at 1.0 KHz. Values of C3 and R7 are selected so that a worst case tolerance analysis of the components C3 and R7 should not be able to show that the break frequency of the compensation network is below 750 Hz nor above 1500 Hz.

In another alternative embodiment of the compensation network 40, the resistance of R7 and capacitance of C3 is selected to establish the break frequency of the compensation circuit to be below a design frequency positioned to be below one decade below the dominant fundamental frequency of any ripple frequency component present on the input signal and the resistance and capacitance of the resistor and capacitor is selected to establish the break frequency of the compensation circuit to be within a frequency range of plus or minus one-half octave of a design frequency centered at the break frequency of the low-pass filter. For example, if the switching frequency of the duty cycle converter within phantom block 80 is 20 KHz, the dominant fundamental frequency of the ripple frequency present on the input signal will be 20 KHz. For this condition, the break frequency of more than one decade below the ripple frequency or below 2 KHz. Under these conditions, the values of R7 and C3 would be dominated and controlled by the break frequency of the Low-Pass Filter 30. By way of example, if the break frequency of the Low Pass Filter 30 were set to be 1.0 KHz, the values of R7 and C3 would again be set to establish a design break frequency for the compensation network to be as close to 1.0 KHz as possible. A worst cast analysis of the network component values should not be able to show that the break frequency can shift to less than 750 Hz nor above 1500 Hz.

The buffer amplifier within phantom block 22 has an inverting and non-inverting input 53, 55 respectively and an output terminal 36. The buffer amplifier has a second differential amplifier, such as U2, 45 which has an inverting input, a non-inverting input 47, 49 respectively and an output terminal also coupled to terminal 36. A buffer input resistor R13, 52 has a first terminal coupled to the second differential amplifier inverting input 47 and a second terminal 53 coupled to the output terminal of the first differential amplifier output terminal 29.

A buffer feedback resistor R12, 54 is coupled between the second differential amplifier inverting input 47 and the second differential amplifier output terminal at terminal 36. The second differential amplifier output terminal is coupled to the amplifier and compensation means output terminal 37.

The oscillator and coupling means 34 has transformer T2. Each winding has at least two terminals T2 has a primary winding having a center tap connected to GND2, 50. The center tap of the secondary represents a first terminal of the secondary winding that is coupled to the non-isolated reference potential. A secondary winding has a center tap coupled to GND1, 18. This center tap represents at least a first terminal of the secondary winding that is coupled to the non-isolated reference potential 18. Each winding is wound on a common core (not shown). The primary winding is isolated from the secondary winding, and may be segment wound on a small ferrite toroid core (not shown) such as the 266CT 125 in core material 3E2S. This core has an outside diameter of 0.375 inches, a height of 0.125 inches and an inside diameter of 0.187 inches. Cores of this type are supplied by many U.S. and foreign suppliers, but the core referenced is supplied by FERROX-CUBE at 5083 Kings Highway, Saugerties, N.Y. 12477, a North American Phillips Company. Segment winding is practiced to enhance isolation and to improve electrical isolation. For evaluation purposes, the core can be made using 38 gauge wire with a one-to-one turns ratio between secondary. The number of turns used will depend on the range of the voltage at terminal 37 and the switching frequency of the oscillator within U1, 20.

U1, 20 pulse width modulator integrated circuit represents an oscillator switching means. The type shown is a UC 1846 made by UNITRODE at 580 Plesant Street, Watertown, Mass. 02172. This device is powered at U1-15 by the input signal from the low-pass filter. It contains an oscillator and switches at least a first terminal, such as 38 of the transformer primary winding terminals to the isolated reference potential, GND2, 50 with a predetermined duty cycle, typically approaching 50 percent. The second terminal of the transformer primary winding, such as the center-tap 37 is coupled to the buffer amplifier output terminal 36. The switched compensated control voltage applied to the primary by operation of the switching means produces a turns ratio related switched compensated control voltage across the transformer secondary. By way of example, if each half of the primary has twenty turns and each half of the secondary has 40 turns, the peak voltage at secondary terminals 31, 32 in response to switching the primary terminals 38, 39 alternately to GND2 will be approximately twice the value of the control voltage applied to the primary center-tap 37.

The elements within phantom block 33 represent a rectifier filter means for rectifying and filtering the switched compensated control voltage developed across the secondary at terminals 31, 32 referenced to the non-isolated reference potential, GND1, 18 to provide the control voltage at the output terminal 16.

The first differential amplifier U3, 23 has an input resistor divider R5, 21 and R6, 41. This divider has a first terminal coupled to receive the input signal at terminal 26 and a second terminal coupled to the isolated reference potential GND2, 50. The divider has a tap terminal coupled to provide a predetermined part of the input signal to the first differential amplifier inverting input 25.

The first differential amplifier 23 also has a reference input resistor divder R8, 56; R9, 57; and R10, 58. This divider has a first terminal coupled to receive the reference signal from the VREF terminal fo U1-2. The reference signal is coupled to the first differential amplifier non-inverting input 27. A second terminal coupled to the isolated reference potential GND2, 50. A tap terminal 51 couples a predetermined part of the reference signal VREF, +5.0Vdc, to the non-inverting input of the first differential amplifier 27.

The pulse width modulator integrated circuit U1, 20 is sometimes rferred to as a switchmode regulator integrated circuit. U1, 30 is referenced to the isolated reference potential GND2, 50. The switchmode regulator integrated circuit 20 has first and second switching output terminals U1, 50 and U1, 11. The terminals are alternately switched to the isolated reference potential 50. The switching intervals are symmetrically timed. A typical operating frequency is in excess of 100 KHz.

In the embodiment of FIG. 1, the transformer windings of T2 each have a first, a second, and a center tap terminal. The first and second terminals of the primary 38, 39 are coupled to respective first and second switching output terminals U1, 50; U1, 26 of the switchmode regulator integrated circuit via NPN switching transistors Q2, Q3, respectively.

The first and second terminal of the secondary are coupled to the respective first and second rectifier diode CR3, 21 and CR4, 24 nodes. The first and second diodes have cathodes connected in common. The cathodes are coupled to a capacitor 19 referenced to the non-isolated reference potential GND1, 18. The cathode are also coupled to the isolated controller output terminal 16. The diodes and capacitor are within the rectifier filter means 33 for rectifying and filtering the switched compensated control voltage across the T2 secondary referenced to the non-isolated reference potential GND2, 50 to provide the control voltage VC at the isolated controller signal output voltage terminal 16.

In the embodiment of FIG. 1, the oscillator switching means within oscillator and coupling means 34, also has a first and second semiconductor switching means such as transistors Q2 and Q3. Each semiconductor switching means has a conduction channel and a control terminal, such as a base. A first and second bias resistor means is included such as R15 and R16. Each bias resistor is interposed between the signal voltage VS and the control terminal of a respectve semiconductor switching means. Each control terminal is coupled to a respective switch mode regulator integrated circuit output terminal, such as U1, 50 and U1, 11. The first and second semiconductor switching means conduction channels are interposed between respective transformer primary first and second terminals 38, 39 and the isolated reference potential GND2, 50. The buffer amplifier of FIG. 1 has an input resistor R13, 52 that has a first terminal coupled to the second differential amplifier inverting input 47 and a second terminal coupled to the output terminal of the first differential amplifier output terminal 29. The buffer amplifier of FIG. 1 also has a second input resistor R16, 59 that has a first terminal coupled to the second differential amplifier non-inverting input 49 and a second terminal coupled to the voltage reference terminal U1, 2.

OPERATION

U4 within the DUTY CYCLE CONVERTER 80 receives the control voltage VC at the inverting input of its control amplifier, U4, 4. Other necessary components are not shown such as the components required to set the frequency of the oscillator within U4. These components are arrived at by reference to the data sheet that relates to the particular pulse width modulated circuit selected for use. The isolator circuit of the present invention uses the same type of integrated circuit for its oscillator means and voltage reference to reduce the number of different parts required, thereby simplifying the design. The UNITRODE Company supplies data sheets and design application notes on request for use in designing converter circuits with its UC1846 integrated circuit. The data sheet on the pulse width modulator selected will be necessary to show what other components are necessary to set the oscillator frequency o the U1 device and to specify the value of the VREF voltage. Other manufacturers such as Silicon General, Motorola, Fairchild, National Semiconductor, Texas Instruments, NEC, and Sprague also provide pulse width modulator circuits suitable for use in place of the UC1846 used in this application.

What is claimed is:

1. An isolated controller circuit responsive to an input signal voltage from the output of a low-pass filter referenced to an isolated reference potential, said input signal voltage having a ripple frequency component, said ripple frequency component having a dominant fundamental frequency, said isolated controller circuit providing a control signal at a signal output terminal referenced to a non-isolated reference potential comprising:

a reference signal source referenced to said isolated reference potential for providing a reference signal;

amplifier and compensation means for amplifying and compensating the signal difference between said input signal and said reference signal to provide a compensated control signal referenced to said isolated reference potential;

oscillator and coupling means responsive to said compensated control signal for providing a switched compensated control voltage referenced to said non-isolated reference potential, the isolation between said isolated and said non-isolated reference potential being preserved; and a rectifier filter means for rectifying and filtering the switched compensated control voltage developed across said secondary to provide said control signal at said output terminal referenced to said non-isolated reference potential.

2. The controller of claim 1 wherein said amplifier and compensation means for amplifying and compensating the signal difference between an input signal and a voltage reference signal to provide said compensated control signal further comprises:

a first differential amplifier having an inverting input, a non-inverting input and an output terminal;

a compensation circut having a first and second terminal and circuit elements selected to provide a predetermined impedance characteristic between said first and second terminal;

a buffer amplifier having an inverting and a non-inverting input and an output terminal;

said first differential amplifier inverting input being coupled to said input signal and said differential amplifier non-inverting input being coupled to receive said reference signal, said compensation circuit being coupled between said first differential amplifier inverting input and said first differential amplifier output terminal;

said buffer amplifier inverting input being coupled to said first differential amplifier output terminal and said buffer amplifier non-inverting input being coupled to said voltage reference, said buffer amplifier having a feedback resistor selected to provide a predetermined voltage gain for the signal between said first differential amplifier output terminal and said buffer amplifier output terminal.

3. The controller of claim 2 wherein said low-pass filter referenced to an isolated reference potential has a first break frequency and wherein said amplifier and compensation means compensation circuit having a first and second terminal and circuit elements selected to provide a predetermined impedance characteristic between said first and second terminal further comprises:
a resistor in series with a capacitor; the resistance and capacitance of said resistor and capacitor being selected to establish a compensation break frequency for said compensaiton circuit, said compensation break frequency being characterized to be within a frequency range of plus or minus one-half octave of a design frequency band centered at the first break frequency of said low-pass filter.

4. The controller of claim 1 wherein said compensation circuit having a first and second terminal and circuit elements selected to provide a predetermined impedance characteristic between said first and second terminal further comprises:
a resistor in series with a capacitor; the resistance and capacitance of said resistor and capacitor being selected to establish a compensation break frequency for said compensation circuit, said compensation break frequency being characterized to be below a design frequency limit positioned to be one decade below the dominant fundamental frequency of said ripple frequency component present on said input signal, the resistance and capacitance of said resistor and capacitor being selected to establish the break frequency of said compensation circuit to be within a frequency range of plus or minus one-half octave of a design frequency centered at the first break frequency of said low-pass filter.

5. The controller of claim 2 wherein said buffer amplifier having an inverting and a non-inverting input and an output terminal further comprises:
a second differential amplifier having an inverting input, a non-inverting input and an output terminal;
a buffer input resistor, said buffer input resistor having a first terminal coupled to said second differential amplifier inverting input and a second terminal coupled to the output terminal of said first differential amplifier output terminal: and
a buffer feedback resistor coupled between said second differential amplifier inverting input and said second differential amplifier output terminal, said second differential amplifier output terminal being coupled to said amplifier and compensation means output terminal.

6. The controller of claim 1 wherein said oscillator and coupling means for coupling and scaling a control signal referenced to an isolated reference potential to a signal output terminal referenced to a non-isolated reference potential further comprises:
a transformer having a primary winding and a secondary winding, each winding being wound on a common core, said primary winding being isolated from said secondary winding, each winding having at least two terminals, a first terminal of said secondary winding being coupled to said non-isolated reference potential;
an oscillator switching means powered from said input signal from said low-pass filter for applying at least a first terminal of said transformer primary winding terminals to said isolated reference potential with a predetermined duty cycle; a second terminal of said transformer primary winding being coupled to said buffer amplifier output terminal, a switching voltage being applied to said primary by operation of said switching means producing a turns ratio related switched compensated control voltage across said transformer secondary.

7. The controller of claim 2 wherein said first differential amplifier further comprises:
an input resistor divider having a first terminal coupled to receive said input signal;
a second terminal coupled to said isolated reference potential; and
a tap terminal coupled to provide a predeterminded part of said input signal to the inverting input of said first differential amplifier.

8. The controller of claim 2 wherein said first differential amplifier further comprises:
a reference input resistor divider having a first terminal coupled to receive said reference signal;
a second terminal coupled to said isolated reference potential; and,
a tap terminal coupled to provide a predetermined part of said reference signal to the non-inverting input of said first differential amplifier.

9. The controller of claim 6 wherein said oscillator switching means further comprises:
a switchmode regulator integrated circuit referenced to said isolated reference potential and powered from said input signal;
said switchmode regulator integrated circuit having first and second switching output terminals, said terminals being alternately switched to said isolated reference potential, the swithching intervals being symmetrically timed; and
wherein, said transformer windings each have at least a first, second, and a center tap terminal;
said first and second terminals of said primary being coupled to respective first and second switching output terminals of said switchmode rgulator integrated circuit;
the center tap terminal of said primary being coupled to said buffer amplifier output terminal, the switching voltage applied to said primary by operation of said switching means producing a turns ratio related switched control voltage across said transformer secondary;
the center tap terminal of said secondary winding being coupled to said non-isolated reference potential;
the first and second terminal of said secondary being coupled to respective first and second rectifier diode anodes;
said first and second diodes having cathodes connected in common and being coupled to a capacitor referenced to said non-isolated reference potential and to said isolated controller output terminal, said diodes and capacitor being within said rectifier filter means for rectifying and filtering the switched compensated control voltage across said secondary referenced to said non-isolated reference potential to provide said control voltage at said isolated controller signal output voltage terminal.

10. The controller of claim 9, wherein said oscillator switching means further comprises:

first and second semiconductor switching means, each semiconductor switching means having a conduction channel and a control terminal; and first and second bias resistor means, each bias resistor being interposed between said signal voltage and the control terminal also of a respective semiconductor switching means, each control terminal being coupled to a respective switchmode regulator integrated circuit output terminal, said first and second semiconductor switching means conduction channels being interposed between respective transformer primary first and second terminals and said isolated reference potential.

11. A method for sensing an input signal voltage from the output of a low-pass filter referenced to an isolated reference potential and for providing a control signal at a signal output terminal referenced to a non-isolated reference potential comprising the steps of:

sensing a reference signal source referenced to said isolated reference potential, the reference signal source being characterized to provide a reference signal;

sensing said input signal voltage;

amplifying and compensating the signal difference between said input signal and said reference signal to provide a compensated control signal referenced to said isolated reference potential;

oscillating and coupling the compensated control signal by alternately applying the compensated control signal to each side of a center-taped primary winding on a transformer to provide a switched compensated control voltage across a secondary on the transformer; and, rectifying and filtering the switched compensated control voltage to provide said control signal at said signal output terminal referenced to said non-isolated reference potential, the isolation between said isolated and said non-isolated reference potential being preserved.

* * * * *